United States Patent [19]
White

[11] Patent Number: 6,092,765
[45] Date of Patent: Jul. 25, 2000

[54] INFRARED DEICING SYSTEM FOR AIRCRAFT

[76] Inventor: Richard P. White, 7511 Herns Dr., Weatherby Lake, Mo. 64152

[21] Appl. No.: 09/084,706

[22] Filed: May 26, 1998

Related U.S. Application Data

[60] Provisional application No. 60/048,991, Jun. 9, 1997.

[51] Int. Cl.[7] .................................................. B64D 15/00
[52] U.S. Cl. ........................................................ 244/134 R
[58] Field of Search ......................... 244/134 R, 134 D; 219/121.65, 121.66, 202; 431/328, 329

[56] References Cited

U.S. PATENT DOCUMENTS

| | | | |
|---|---|---|---|
| 3,602,211 | 8/1971 | Charman | 126/271.2 |
| 3,612,075 | 10/1971 | Cook | 134/99 |
| 3,784,353 | 1/1974 | Chapurin | 431/329 |
| 3,818,884 | 6/1974 | Pfender | 123/142.5 R |
| 3,838,281 | 9/1974 | Ellis et al. | 250/308 |
| 4,039,275 | 8/1977 | McGettrick | 431/329 |
| 4,450,346 | 5/1984 | Boaz | 219/522 |
| 4,461,178 | 7/1984 | Chamuel | 73/599 |
| 4,482,114 | 11/1984 | Gupta et al. | 244/134 B |
| 4,565,321 | 1/1986 | Vestergaard | 239/172 |
| 4,752,049 | 6/1988 | Cole | 244/134 B |
| 4,826,107 | 5/1989 | Thronton-Trump | 244/134 R |
| 4,898,330 | 2/1990 | Betchan | 239/135 |
| 4,900,891 | 2/1990 | Vega et al. | 219/121.6 |
| 5,318,254 | 6/1994 | Shaw et al. | 244/134 C |
| 5,417,389 | 5/1995 | Chew et al. | 244/134 R |
| 5,458,299 | 10/1995 | Collins et al. | 244/134 C |
| 5,597,140 | 1/1997 | Madsen | 244/134 R |

OTHER PUBLICATIONS

Gas Cat Brochure by Infra-Red Technologies, Inc. 1995.

*Primary Examiner*—Galen L. Barefoot
*Attorney, Agent, or Firm*—Wm. Bruce Day

[57] ABSTRACT

Flameless infrared catalytic heater units are mounted in a generally wing-shaped carrier for positioning above surfaces of an aircraft. The carrier is attached to a boom end extending from a truck or other suitable self-propelled ground equipment. A temperature sensor bounces an infrared signal off the aircraft surface and inputs the skin temperature into a micro-controller regulating the output of the infrared heater units. The micro controller maintains a desired safe skin temperature sufficient to melt ice and snow from the aircraft surfaces without blistering the paint or raising concern about temperatures within fuel tanks. The catalytic heater units use inexpensive natural gas or propane. Use of this system substitutes for expensive and hazardous ethylene glycol solutions heretofore sprayed over the aircraft.

7 Claims, 9 Drawing Sheets

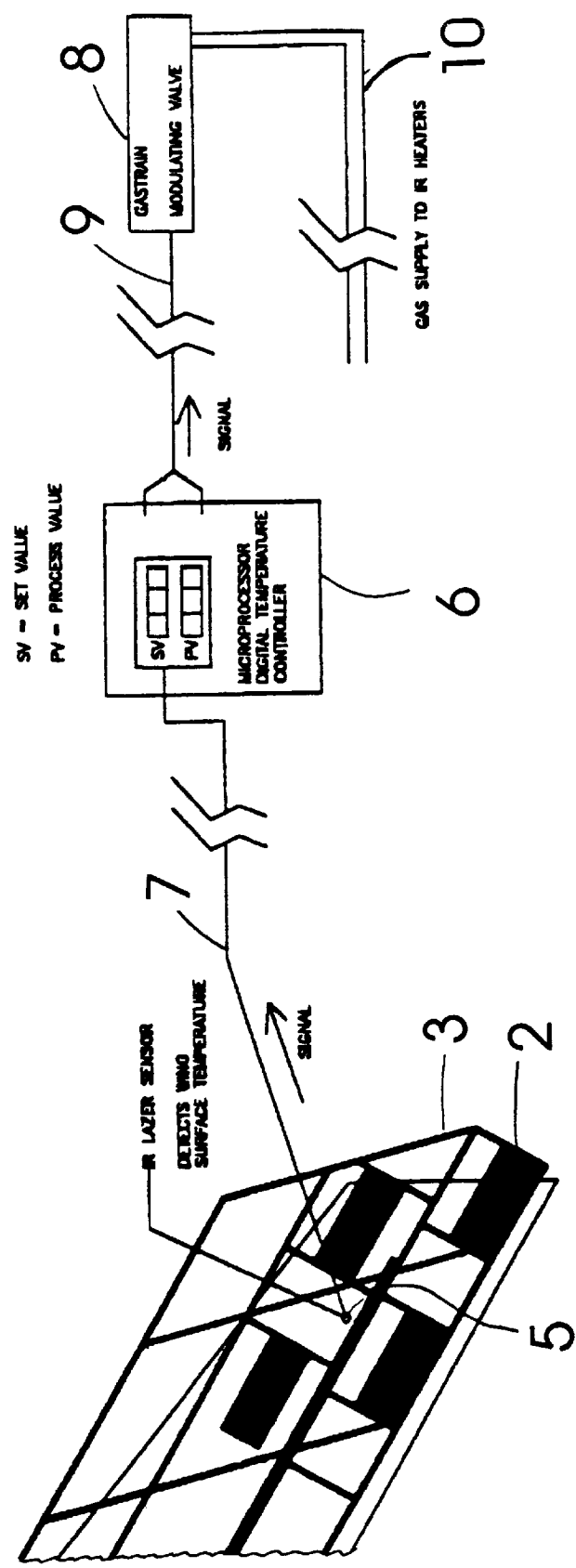

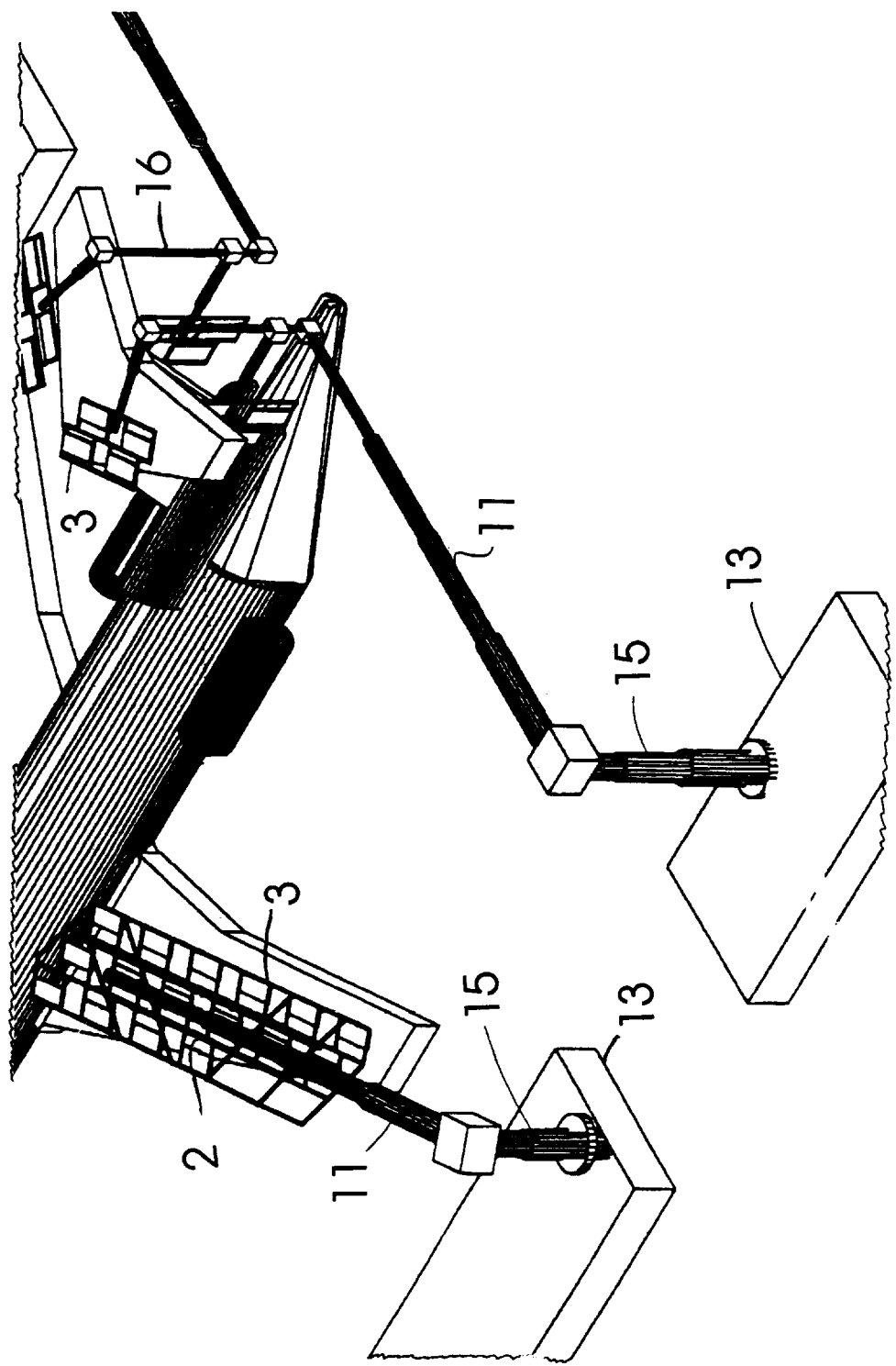

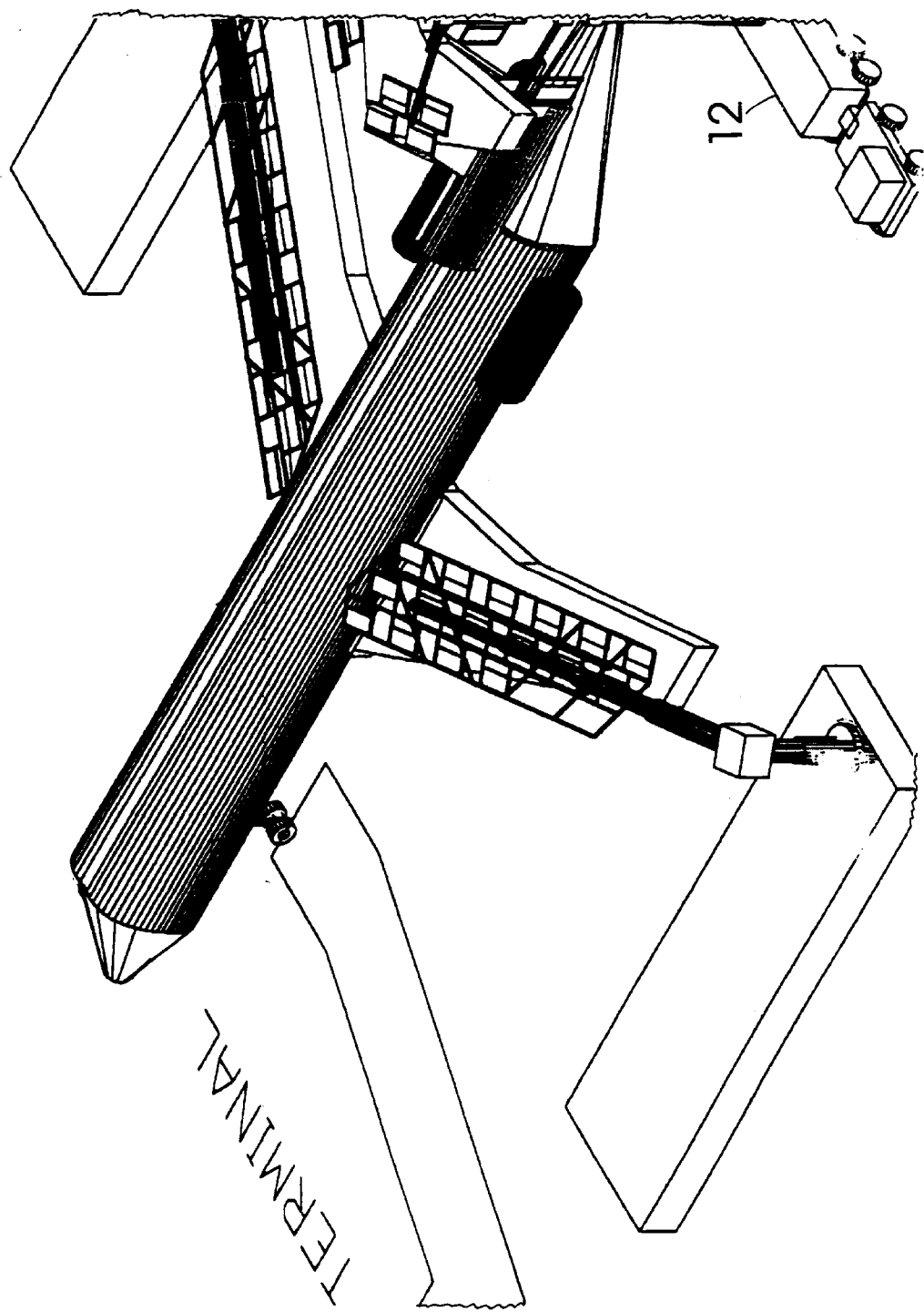

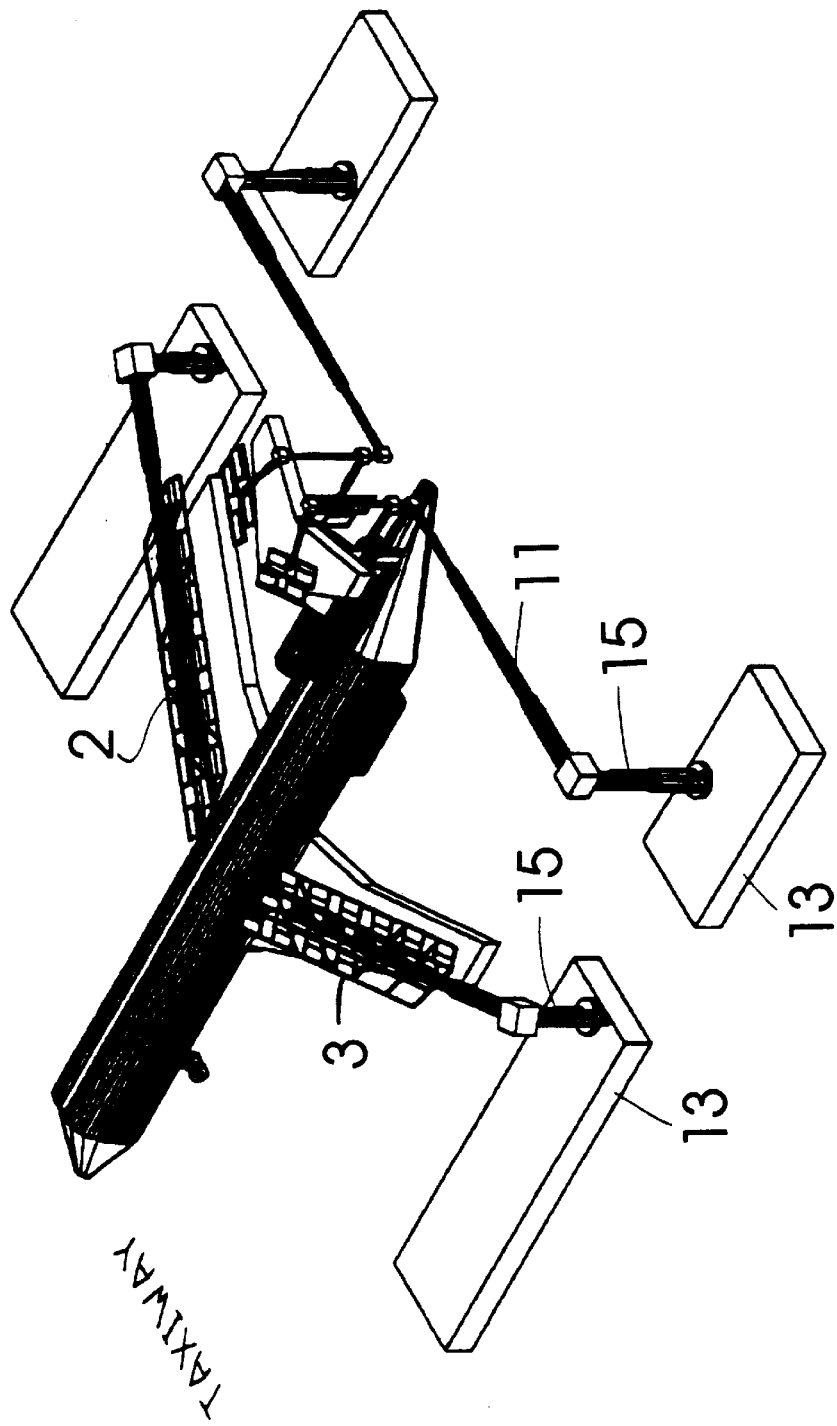

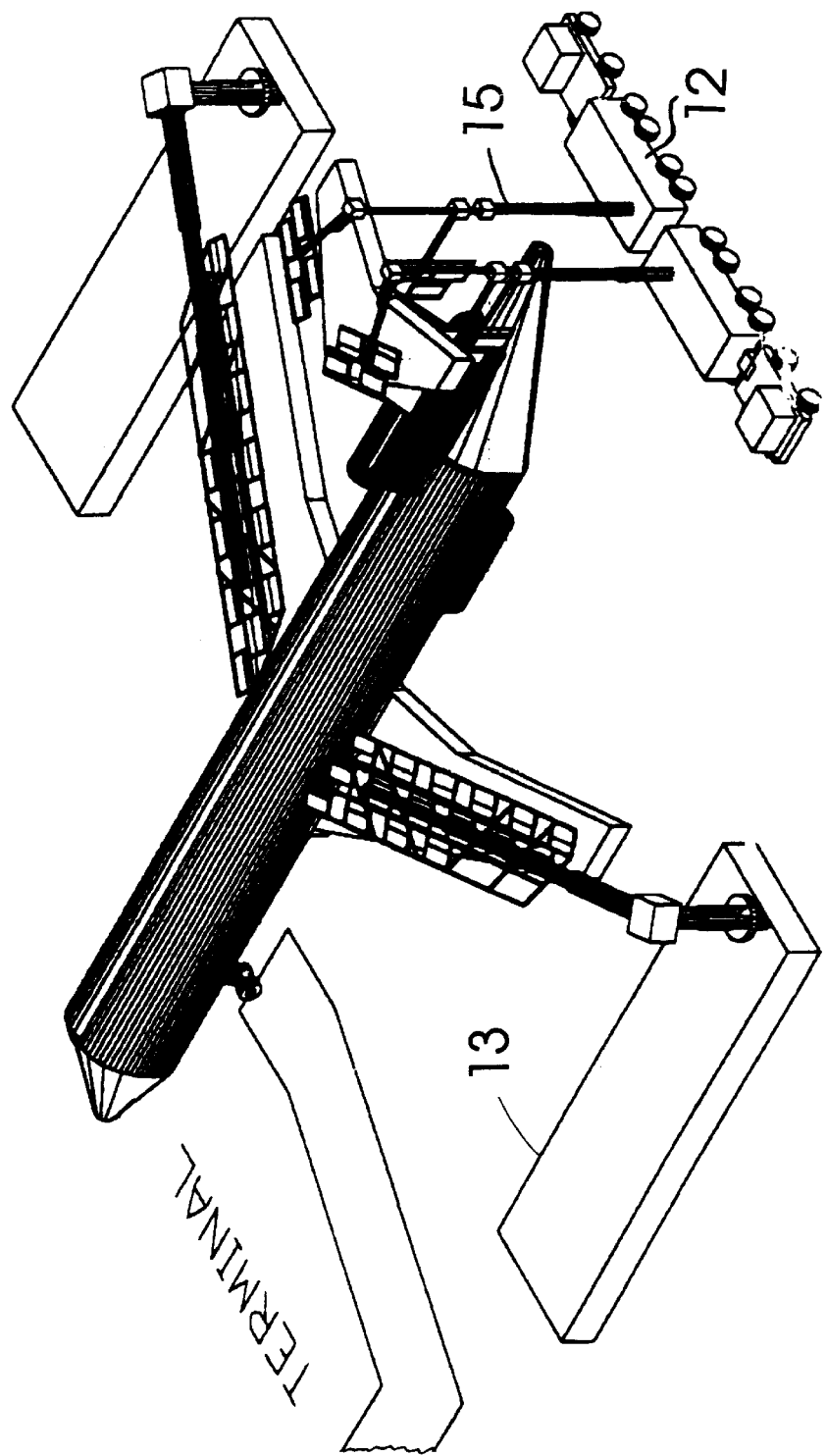

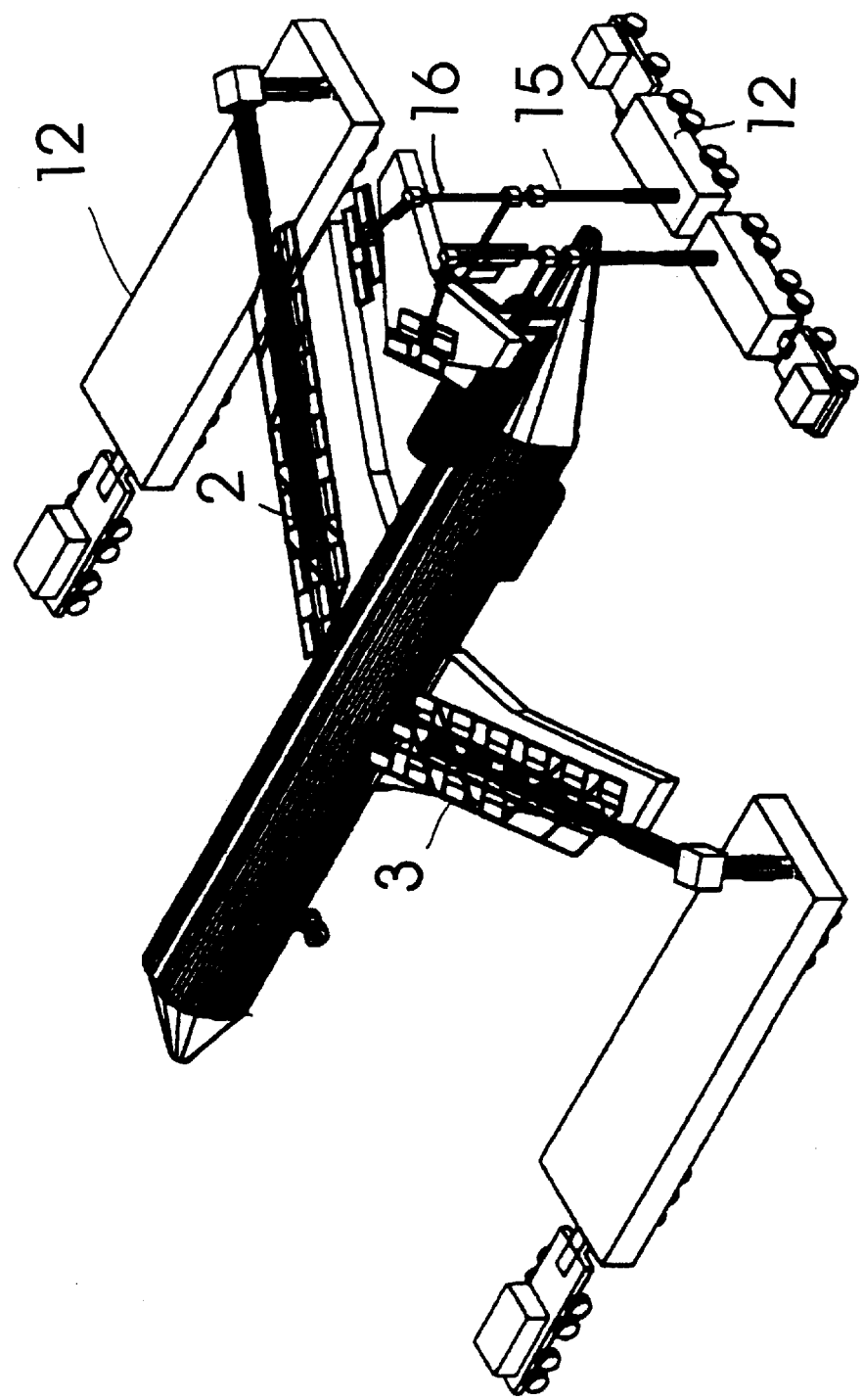

INFRARED DEICING SYSTEM FOR AIRCRAFT

PRIOR RELATED APPLICATIONS

This application is based upon U.S. provisional patent application Ser. No. 60/048,991, filed Jun. 9, 1997, from which priority is claimed.

BACKGROUND OF THE INVENTION

Deicing systems for aircraft have typically used a water and glycol mixture which is sprayed on the aircraft while the aircraft is in the parking area awaiting clearance for takeoff. However, the aircraft is frequently required to wait for a long time and ice may build up again on the aircraft surfaces. The ethylene glycol used may not be sprayed in or around the aircraft engines and the glycol may be considered a hazardous or potentially hazardous material to the environment. Glycol is an expensive mixture and significant sums are spent every year by the airline industry for deicing fluid.

Deicing glycol mixtures have usually been a heated 50% solution of ethylene glycol with water. Deicing fluid is sprayed on the aircraft, usually only on its wing, tail and control surfaces, until a deicing truck operator believes the ice, snow or frost to be gone. Deicing may take up to 30 minutes and use several hundred gallons of ethylene glycol. The average cost at present day to deice a small to medium size commercial passenger airplane such as an MD-80, Boeing 727, 737 or 767 is $3,500–$4,000. A large jet such as a 747 with a ⅛" accumulation of clear ice may cost $10,000 in deicing fluid alone.

The pilot must also rely on the judgment and training of the deicing truck operator who may not be adequately trained or appreciate the degradation in coefficient of lift caused by ice alteration of the airfoil surface or the weight of the ice on the airframe. The pilots are without ice detector instruments to monitor wing or control surface icing. The only instruments available to the cockpit crew are engine inlet sensors which are effective against engine anti-icing. The aircraft is normally equipped with wing and tail leading edge anti-icing systems using hot air pulled from jet engine turbine stages but these can only be used while airborne or for only short periods while on the ground. Further, they tend not to be effective against accumulations of ice and are anti-icing systems rather than deicing systems.

Not only is the deicing process expensive and the pilot without effective instrumentation, but the glycol solution has been listed by the Environmental Protection Agency as a hazardous material. Glycol is a poisonous material and causes damage to wildlife. As a result, the EPA requires users to build containment basins and diversion structures to keep glycol out of watersheds. Nevertheless, containment structures are only partially effective, release into sewage treatment plants requires special processing and airborne spray remains difficult, if not impossible to contain. Yet, glycol deicing and anti-icing is still generally considered to be the most effective method of aircraft ice elimination and prevention.

Anti-icing uses a more viscous form of glycol as an anti-icing fluid, polyethylene glycol. This is sprayed onto the aircraft after ethylene glycol has deiced the aircraft. The anti-icing fluid is used only in small amounts and tends to stay on the aircraft surfaces until blown off during take-off. Because only comparatively small amounts are used, anti-icing fluid is not considered to be as problematical as use of deicing fluid.

The aircraft skin temperature may be approximately that as would be obtained during a hot summer afternoon in the U.S. southern latitudes, 180° F. This procedure and temperature has been approved by the Federal Aviation Administrators as noninjurious to the aircraft. It does not cause the paint to blister, sealants to weaken, wiring insulation to char or fuel in wing tanks to dangerously vaporize.

SUMMARY OF THE PRESENT INVENTION

The present invention provides a non-hazardous, non-polluting alternative to the use of glycol for removing ice, snow and frost from aircraft surfaces. The main constituent of the invention is a flameless infrared heating system which is positioned by various means, including both fixed and transportable systems over the wing, tail, and fuselage sections of the aircraft. The flameless radiant infrared heaters heat the skin surface of the aircraft to a selected and controlled temperature to deice the aircraft. Temperature sensitive devices mounted in conjunction with the infrared heaters sense aircraft skin temperature and through a feedback loop circuit and microcontroller controlling output of the heater are able to maintain a desired aircraft skin temperature.

The flameless infrared heaters are arrayed in panels and may be mounted appropriately in a hangar, on moveable boom trucks, or other suitable material handling equipment or on fixed handling units with booms.

OBJECTS OF THE INVENTION

The objects of the invention are: to provide an alternative, non-hazardous substance and flame free alternative to the use of glycol solutions for deicing aircraft; to provide a low cost alternative to glycol; to provide a controlled heater unit for deicing aircraft which regulates the temperature so as not to damage the aircraft; to provide a completely flameless catalytic infrared heater system; to provide an effective aircraft deicing system; to provide an aircraft deicing system which can be fitted with instrumentation to communicate a no ice condition to a deicing unit operator and/or to the cockpit crew; and to provide such a deicing system that is efficient, safe and non-hazardous and reliable.

Other objects and advantages of the present invention will be understood through study of the following drawings and specifications.

BRIEF DESCRIPTION OF THE DRAWINGS

FIG. 4 is an enlarged perspective view showing details of fixed base booms for the infrared heater panel arrays.

FIG. 5 is a perspective view showing mounting booms and boom trucks holding arrays of infrared heaters.

FIG. 6 is a perspective view of an undersurface of one of the arrays of infrared heaters.

FIG. 7 is a schematic block diagram of the disclosed aircraft deicing process.

FIG. 8 is a perspective view of fixed base booms mounting the infrared heater arrays.

FIG. 9 is a perspective view showing truck trailers and fixed base boom mounted infrared heater arrays.

DESCRIPTION OF THE PREFERRED AND ALTERNATE EMBODIMENTS

Detailed embodiments of the invention are disclosed herein, however, it is to be understood that the disclosed embodiments are merely exemplary of the invention which may be embodied in various forms. Therefore, specific structural and functional details disclosed herein are not to be interpreted as limiting, but rather merely as a basis for teaching one skilled in the art to variously employ the present invention in any appropriately detailed form, and as a basis for the claims.

Figure 3:
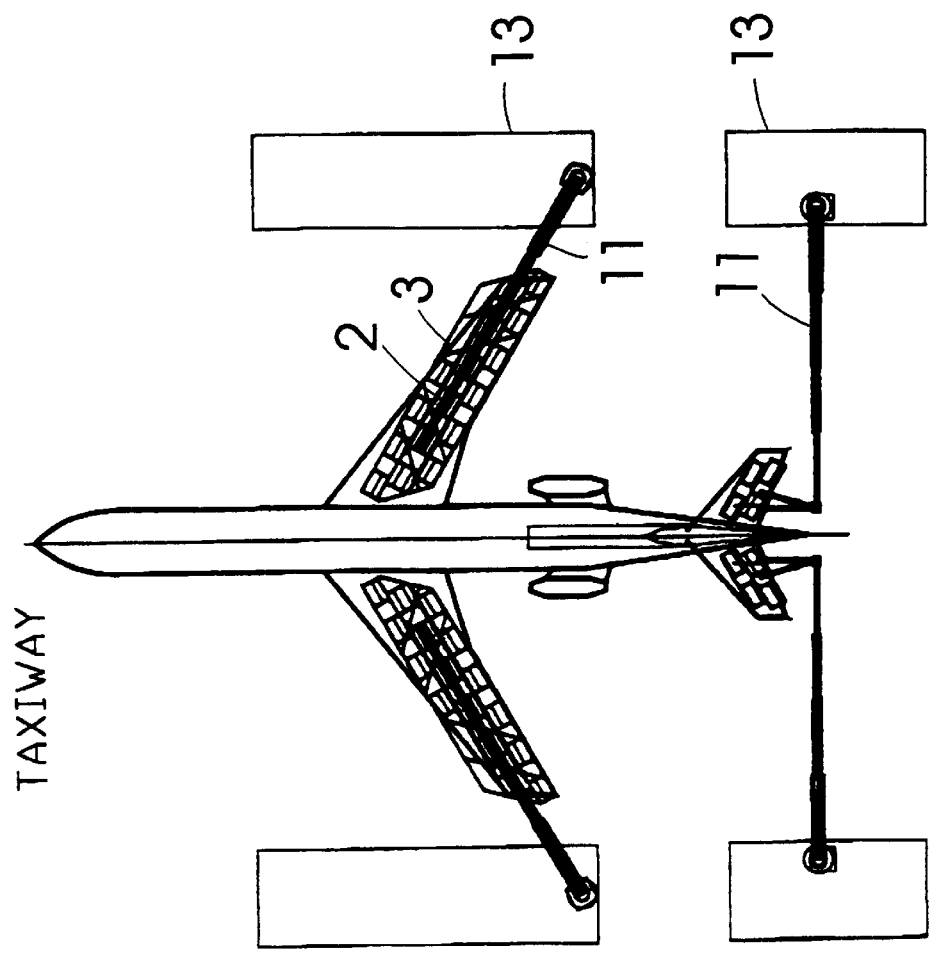
FIG. 3 is a partially schematic view showing a portion of an aircraft wing covered by an array of infrared heaters with a temperature sensing signal returned through a temperature controller and showing further processing of the signal to regulate the temperature of the aircraft skin.

The instant invention uses an array of flameless infrared heaters which emit energy in the 3 to 7 micron wavelength region. This region, particularly 3.5 microns, is the best wavelength to be absorbed by water, such as ice, on an aircraft wing. Flameless infrared heaters have been used in industry for a number of years in paint booth drying operations and other situations involving localized radiant heat. These infrared heaters use platinum catalytic units which must be preheated to a desired temperature for catalytic operation. Preheating is generally done by an electric resistance or Calrod element. FIG. 6 illustrates the heat emitting side of an array 1 of infrared heater panels 2 which are mounted and supported in a framework 3 positioned above the surface of an aircraft wing 4. The infrared heater panels 2 direct infrared energy toward the surface of the wing 4 which is preferably situated a distance of approximately one meter from the panels 2. Supported in the framework 3 are a plurality of infrared laser sensors 5 which detect the emission of heat energy from the surface at which the laser sensor is directed such as the wing. The sensors 5 feed back a heat energy reading to a temperature controller and microprocessor 6, FIG. 3, via wiring 7, The microprocessor 6 is a digital temperature controller which is microprocessor based and manufactured by RKC and is preferably either of the D or P series. The controller 6 identifies the wing surface temperature and compares it to a desired surface temperature value which may be present or may be input by an operator. The controller 6 then signals a gas train modulating valve 8 through wiring 9 which then controls the flow of gas via supply lines 10 to the infrared heater panels 2. Preferably, the infrared temperature sensor is a Raytek T series sensor and the modulating gas valve is a Maxitrol of the M/MR series.

This microprocessor based, closed-loop temperature control system controls the amount of fuel, either natural gas, propane, or butane, which is supplied to the infrared heater panels to obtain the desired skin temperature of the heated surface. Preferably skin temperatures of 130° F. maximum are reached and the controller modulates the gas train so as not to exceed present skin temperatures, such as 140° F. Federal Aviation Administration (FAA) evaluations indicate that 180° F. is a safe maximum skin temperature which will not blister paint, degrade fuel tank sealants, harm electrical wiring or otherwise cause damage to the aircraft or cause fuel in wing tanks to become excessively heated. 180° F. is a normal maximum skin temperature reached through sun heating at midday in United States southern latitudes. Skin temperatures of 130° F., as may be regulated by the present invention, are far below the maximum sun caused temperature. A digital or temperature indicator can be provided to the pilot of the aircraft or to the deicing system operator to display the skin temperature of the aircraft. This display can be in the form of a skin temperature gauge mounted on an operator's console associated with a boom truck or fixed base boom. Alternatively, it is foreseen that infrared temperature sensors 5, or other appropriate temperature sensors, may be mounted on the aircraft in suitable locations. These may be connected to indicator gauges in the cockpit so that the pilot or flight crew member could determine the aircraft skin temperature at the monitored location. For example, if the indicator read 100° F., the pilot would know that the location was snow and ice free, as it would not be possible for that skin temperature to occur when snow or ice is on the skin.

Figure 1:
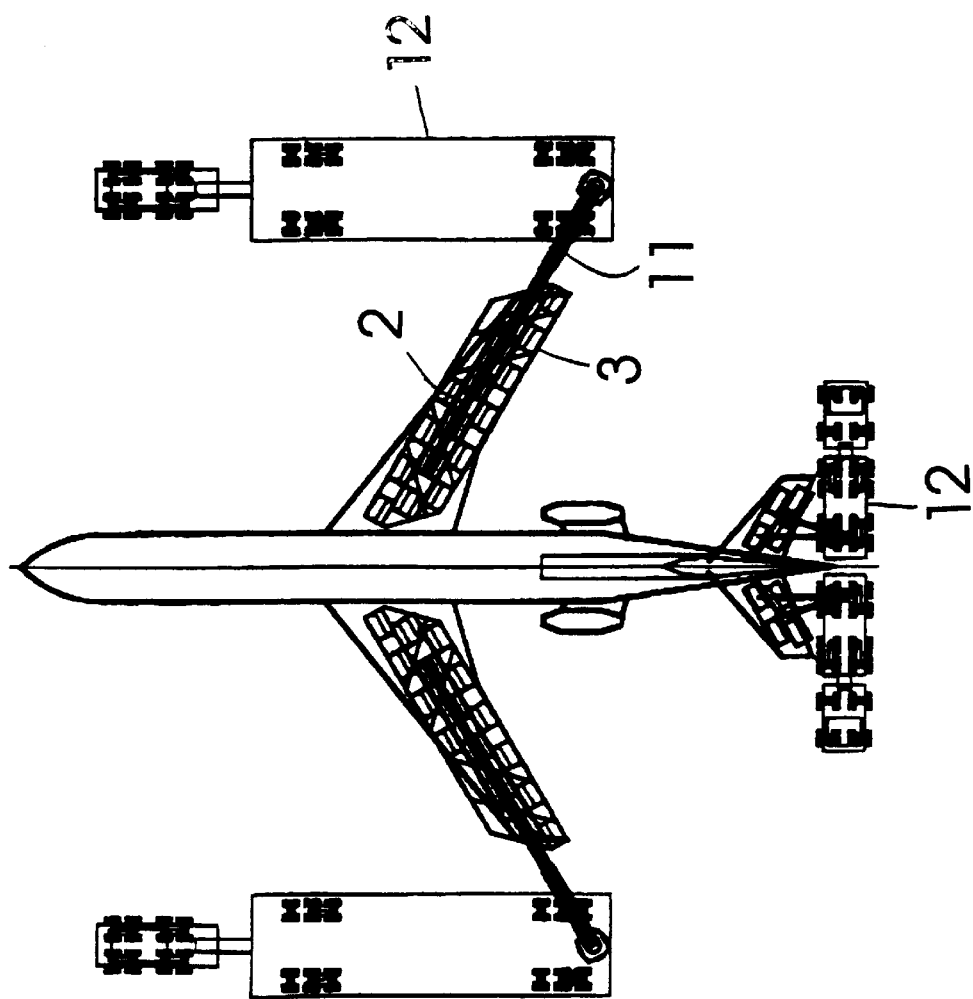
FIG. 1 is a partial schematic overhead view of an aircraft with its wing and flat tail surfaces covered by panel arrays of infrared heaters extending from boom trucks.

An array 1 of heater panels 2 are appropriately sized for the wing and tail surfaces of an aircraft. FIG. 1 shows the various arrays 1 supported by arms 11 which are both extensible and rotatable and which are supported by mobile ground handling equipment 12. The ground handling equipment can consist of fixed installations with movable booms, trailers mounted with booms or boom trucks. All of them have the means to extend the array 1 over a surface of an aircraft which must be deiced.

Figure 2:
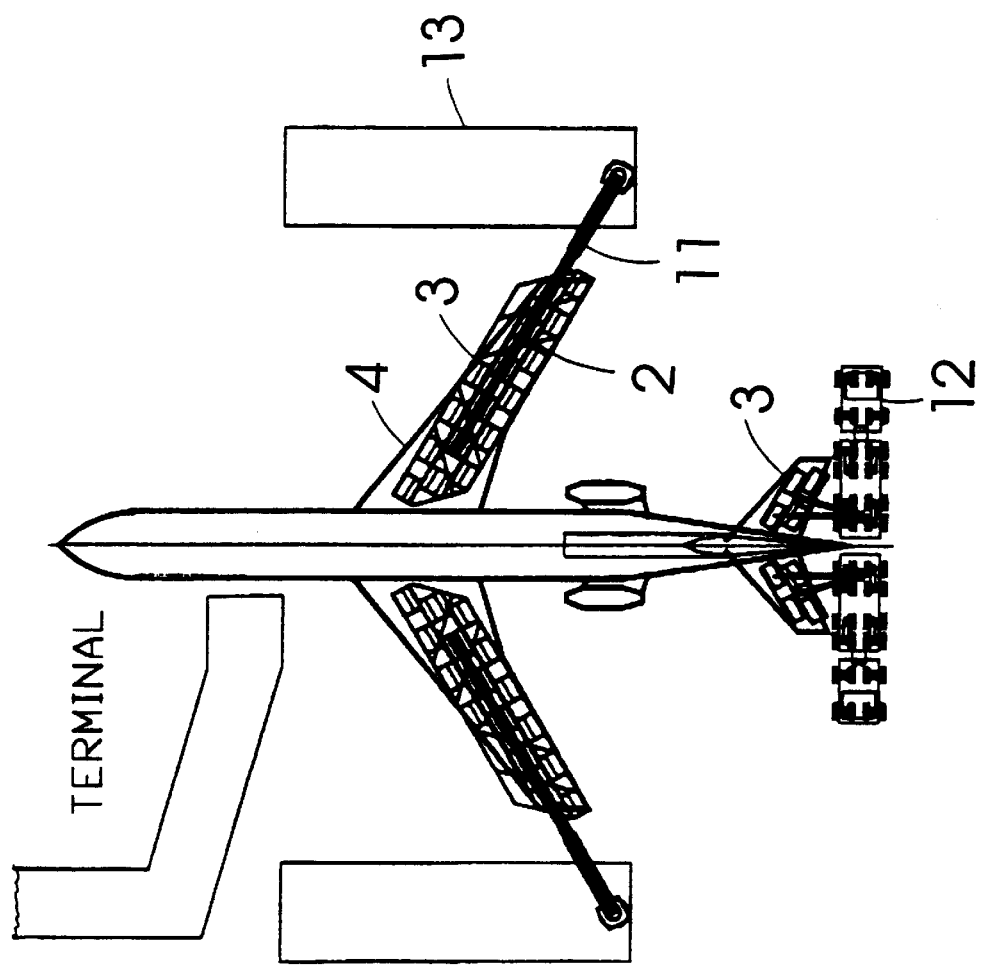
FIG. 2 is a partial schematic drawing of an aircraft with wing and tail surfaces covered by an array of infrared heaters extending from a combination of boom trucks and fixed base booms.

FIG. 2 shows a like array in which infrared heater panels 2 on the tail surfaces are supported by mobile ground handling equipment such as a boom truck 12 but the panels 2 overlaying the wing 4 are supported by fixed ground installations 13. As shown in FIG. 2, the aircraft may be deiced at the terminal gate.

FIG. 4 shows a somewhat different arrangement in which the infrared heater panels 2 and a framework 3 both for the wings and tail surfaces of the aircraft are supported by fixed ground installations 13. These include rotatable, extendable booms which can be elevated for correct positioning.

FIG. 5 shows an enlarged perspective view of a proposed fixed ground installation 13 which includes an upright standard 15 supporting an extensible and rotatable arm 11 which is in turn connected to the array of heater panels 2 on the support framework 3.

The array in FIG. 5 may be combined with mobile ground handling equipment 12.

FIG. 6 provides a closer detail of the array 1 and shows the panels 2 mounted therein and supported within the framework 3. FIG. 6 shows the positioning of an infrared temperature sensor 5 which directs a signal as indicated at a surface to be measured for temperature. The signal is reflected back to the sensor and is transmitted to a microcontroller for automatically regulating the heaters panels 2 to control the skin temperature.

FIG. 7 is a diagram of the steps 18 of deicing an aircraft using the present invention. First, the aircraft enters an appropriate area for deicing, which may include completely drying the skin of the aircraft. Arrays 1 of heater panels 2 are positioned over the surfaces to be deiced, such as the wing and tail surface areas. Next, the infrared temperature sensor 5 measures the temperature of the aircraft skin and transmits that information to a microprocessor digital temperature controller. The controller compares a present or desired temperature with the actual temperature and signals the gas modulating valve or regulator to direct the proper amount of fuel to the heater panels 2. The temperatures can be indicated to the cockpit crew, the deicing equipment operator and can be stored to a PC for recording.

Finally, deicing is completed and the aircraft departs.

FIG. 9 discloses a form of boom truck 25 including an extendible boom 27 with a conventional boom control mechanism 29 providing azimuth and elevation variability. The heater array 1 is rotatably mounted to the boom end and includes beacon lights 31 suitable for aircraft ramp operations. The propane tank and associated gas train controls are mounted within the truck 25. The truck 25 also includes a glycol tank and pump and glycol spray nozzles for applying the Type IV anti-icing fluid previously mentioned. This is the thin coating of viscous glycol used to prevent or reduce ice or snow accumulation between deicing and take-off.

FIG. 6 illustrates the array 1 including various heater panels 2 on the underside. The infrared heater sensors 5 are identified. The microprocessor controller temperature controller 6 may be zoned to associate certain ranks or files of heater panels 2 with certain sensors 5. This would require multiple gas delivery lines and multiple gas regulators, but may be appropriate as conditions dictate.

The process of aircraft deicing using infrared heater panels begins wherein an aircraft first enters a deicing area, which may be at the gate, in a hangar area, or adjacent to the end of the runway. The fixed grounding handling equipment or mobile ground handling equipment positions the infrared heater panels and their supporting framework 3 over aircraft wing, tail, and fuselage areas and begins supplying infrared energy to melt any ice that has formed on those surfaces. The infrared temperature sensors obtain temperature of the aircraft skin surface. The sensor transmits the temperature to a digital temperature indicator if supplied with the system and the microprocessor based digital temperature controller. The digital temperature controller compares a present temperature, which is a desired temperature of the aircraft with the actual temperature of the skin. The controller signals the gas modulating regulating valve to supply the correct amount of fuel to the heater panels 2 to achieve the desired present skin temperature. This temperature may also be displayed on a digital temperature indicator which is visible to the pilot. After the skin has reached a desired temperature and all ice has melted off the aircraft, the infrared heater panels and their supporting framework 3 are removed from the aircraft and the aircraft is ready to depart.

Another form of boom truck 25 adapted for carrying the infrared panel array 1. These trucks are sometimes termed "cherry picker" trucks.

Another form of ground handling equipment in the form of a trailer unit 35 which may be conveniently towed by a general purpose aircraft ramp tug or non-specific pickup truck. This trailer unit 35 is identical to the truck 25 but lacks the operator's cab and is not self-propelled. The trailer 35 also provides anti-icing capability.

A plurality of heater panel arrays 1 mounted within a hanger of permanent or tent-like construction. The hanger may be open ended. Preferably, the arrays 1 are affixed to moveable mounts within the hanger to accommodate different sizes and configurations of aircraft, including fixed wing aircraft and helicopters and tall-tail and conventional tail aircraft.

While the above invention has been described and illustrated with regard to particular embodiments, it should be apparent to those skilled in the art that various modifications are possible. The invention is not limited to the specific forms or arrangement of parts described herein, except insofar as such limitations are included in the following claims.

What is claimed and desired to be secured by letters patent is as follows:

1. A deicing system for aircraft surfaces comprising:
    a) a plurality of flameless infrared heaters which emit energy in the 3 to 7 micron wavelength region;
    b) said heaters being mounted in an array within a framework positionable in proximity to an exterior surface of an aircraft;
    c) a plurality of heat sensors also mounted in said framework and which detect the emission of heat energy from the exterior surface of said aircraft; and
    d) a temperature controller associated with said framework and receiving first signals from said sensors and sending second signals to a regulator for varying intensity of said infrared heaters, the temperature controller controlling the temperature of the exterior surface of said aircraft within a selected range.

2. The deicing system set forth in claim 1 wherein said heaters are mounted in an array and supported from a boom truck.

3. The deicing system set forth in claim 1 wherein said heaters are mounted in an array and supported from a boom trailer.

4. The deicing system set forth in claim 1 wherein said heaters are mounted in an array and supported from a fixed base boom installation.

5. The deicing system set forth in claim 1 wherein said heaters are mounted in an enclosure for receiving an aircraft.

6. A deicing system for aircraft surfaces comprising:
    a) a plurality of flameless, gas catalytic infrared heater units which emit energy in the 3 to 7 micron wavelength region, the intensity of said heater unit being controllable by a modulating valve;
    b) said heater units being mounted in an array within a framework and including means for positioning said framework adjacent an aircraft surface;
    c) a plurality of heat sensors mounted in said framework which detect the emission of heat energy from the aircraft surface; and
    d) a temperature controller associated with said framework and receiving first signals from said heat sensors and sending second signals to said modulating valve for varying the intensity of said infrared heater units to control the temperature of the aircraft surface.

7. The deicing system set forth in claim 6 including instrument means for indicating the temperature of the aircraft surface.

* * * * *